Sept. 27, 1960 A. C. SAMPIETRO 2,954,237
AUTOMOTIVE LEVELING AND ANTI-DIVE SYSTEM
Filed Feb. 27, 1956 3 Sheets-Sheet 3
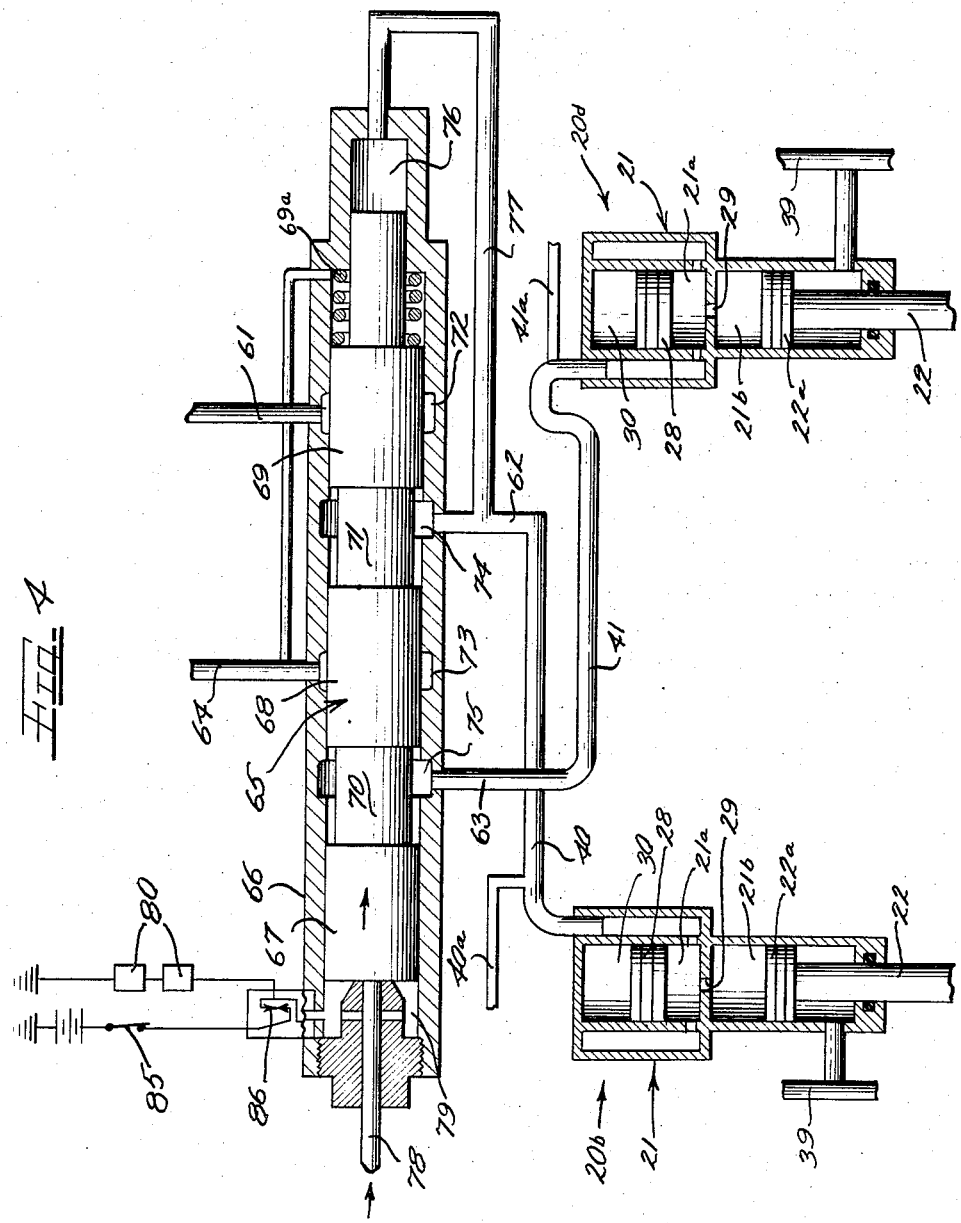
Inventor
ACHILLES C. SAMPIETRO United States Patent Office 2,954,237
Patented Sept. 27, 1960

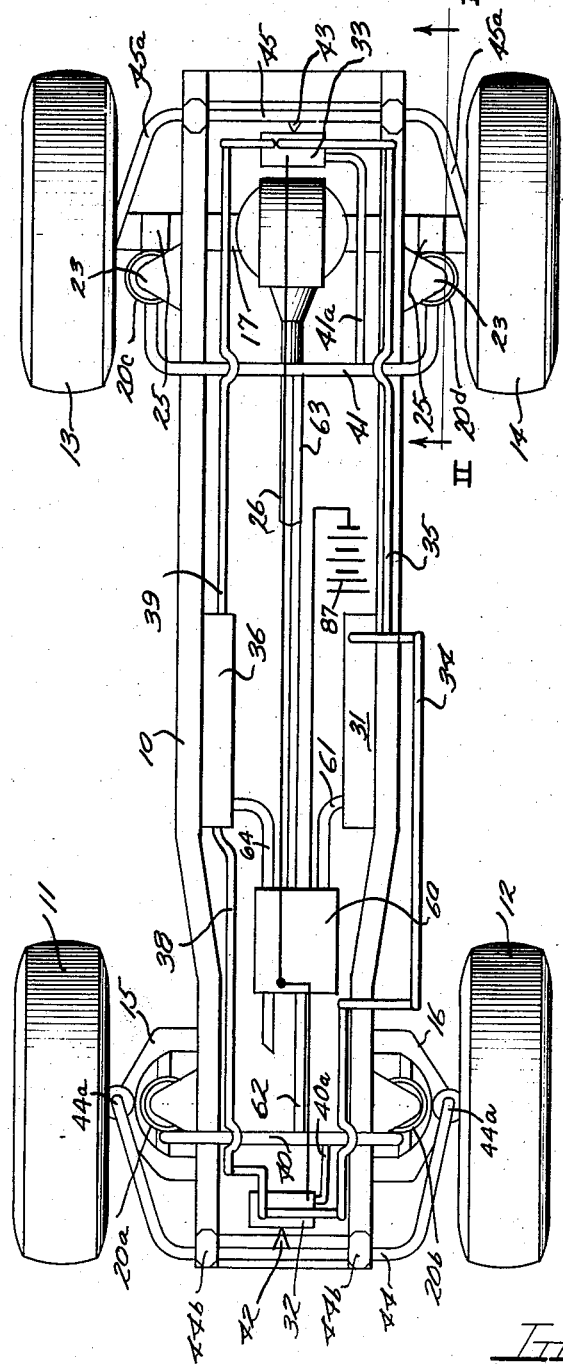

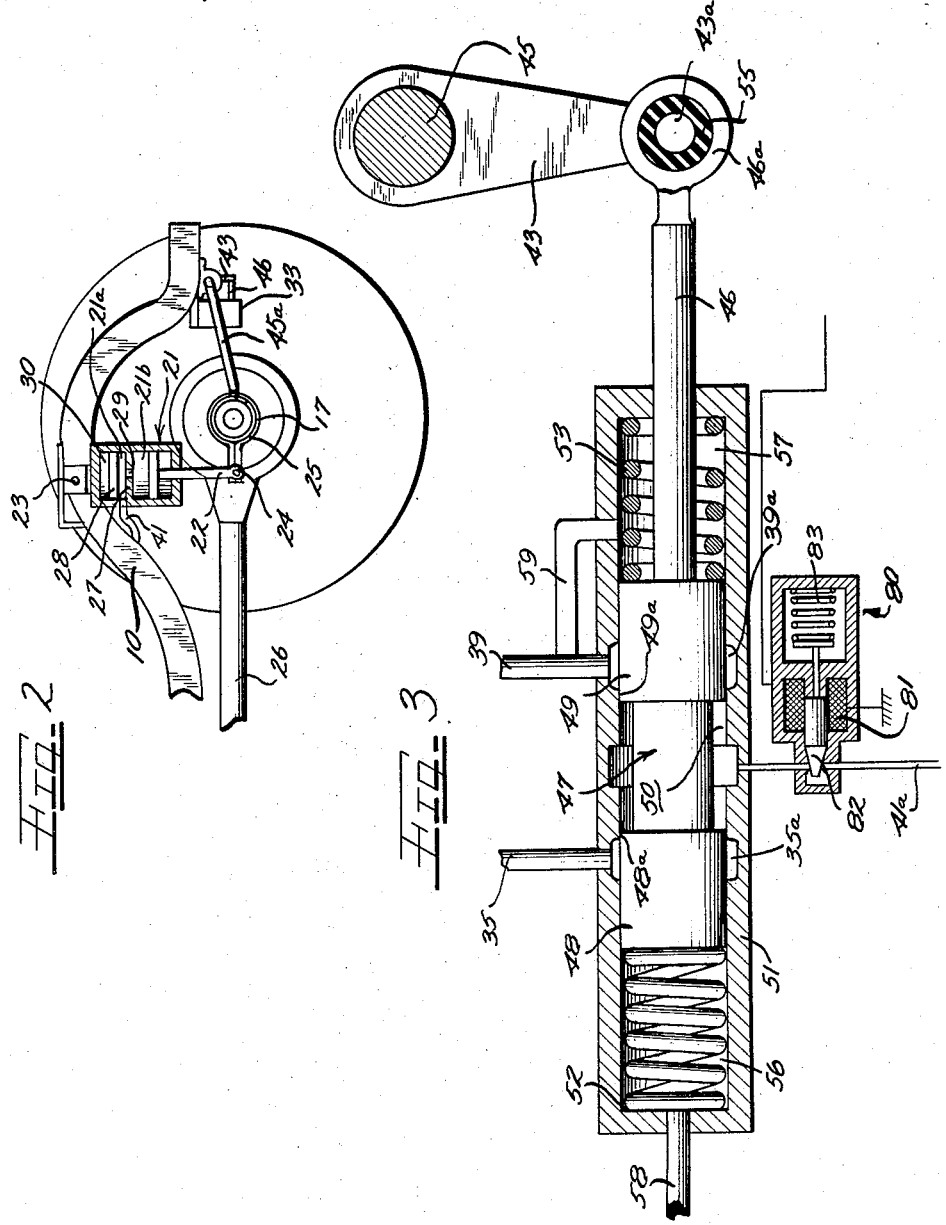

2,954,237
AUTOMOTIVE LEVELING AND ANTI-DIVE SYSTEM

Achilles C. Sampietro, Detroit, Mich., assignor to Thompson Ramo Wooldridge Inc., a corporation of Ohio Filed Feb. 27, 1956, Ser. No. 567,766

16 Claims. (Cl. 280—124)

The present invention relates to automotive suspension systems and is, more particularly, concerned with the provision of an improved system for automatically maintaining an automotive vehicle at a constant height above the road surface, both fore and aft, while at the same time providing means for preventing the downward "dive" at the front of the vehicle during braking.

As those skilled in the vehicle suspension field are aware, prior art automotive suspensions have in, commercial practice, ordinarily been without means for maintaining the vehicle body at a predetermined level above its supporting road surface. Thus, as the vehicle load has increased, the body has become lower, compressing the vehicle springs. The resultant change in the running gear linkage relationships has affected adversely tire wear and the handling characteristics of the vehicle. Further, commercially available vehicles have not incorporated any truly satisfactory system for preventing "brake dive" in which the front of the vehicle drops downwardly toward the road as the brakes are applied. Although systems have been proposed for performing leveling and anti-dive functions, systems heretofore advanced have been excessively complex and, further, have failed to integrate satisfactorily the anti-dive and leveling functions into a simple unitary system.

In accordance with the principles of the present invention, an improved vehicle suspension is provided in which hydraulic-pneumatic springs are provided in place of prior art conventional mechanical springs, and a simple yet extremely effective control system is provided for maintaining the vehicle in a completely level condition at all times, including such time as the vehicle brakes are applied.

In accordance with the present invention, a hydraulic-pneumatic spring is provided at each wheel of the vehicle between the wheel support and the vehicle frame. In each of the springs, the relative position of the vehicle frame and the individual wheel support may be varied by the introduction of additional hydraulic fluid under high pressure. A source of high pressure hydraulic fluid is provided with interrelated controls are in turn provided for controlling the flow of such pressurized hydraulic fluid to the separate vehicle springs. In accordance with a preferred form of the invention a vehicle leveling valve is provided for each pair of fore and aft wheels and is adapted to sense the relative position of the vehicle frame with respect to each pair of wheels. Upon a change in position of either leveling valve, hydraulic fluid under pressure is supplied to the springs affecting the leveling valve, or, alternatively, the individual springs are vented to permit lowering thereof. Upon the application of braking force, tending to retard forward motion of the vehicle, hydraulic fluid under pressure is applied to the front vehicle springs to raise the vehicle thereby counteracting brake dive, and at the same time hydraulic fluid is vented from the rear springs to a low pressure sump to permit lowering of the vehicle at the rear. During braking action, the leveling valves are automatically overruled to prevent interference between the leveling valve and the anti-brake dive controlling valve which would, without such a lock-out, conflict with the leveling valve attempting to lower the front of the vehicle while the anti-dive brake controlling valve is at the same time attempting to raise the front of the vehicle. Additional integrated ignition control means are provided for preventing leveling actuation of the vehicle when the ignition is turned off, thereby preventing depletion of the high pressure hydraulic fluid accumulator when the vehicle is not in operation.

It is, therefore, an object of the present invention to provide an improved automotive vehicle suspension system.

Another object of the present invention is to provide an automotive suspension system providing means for leveling the vehicle body relative to the road surface to compensate for changes in vehicle loading occasioned by the addition of weight to the vehicle or the application of the vehicle brakes during forward motion of the vehicle.

Yet another object of the present invention is to provide a single, simplified, hydraulic-pneumatic vehicle suspension system automatically compensating for brake dive as well as variations in the vehicle load.

Still a further object of the invention is to provide an improved vehicle leveling system providing a lock-out mechanism for preventing leveling operation of the system when the vehicle ignition is turned off.

Yet a further object of the invention is to provide a vehicle leveling system integrated with a brake antidive system in a manner whereby leveling operation of the system is prevented during that period in which antidive is functioning.

A feature of the invention resides in the utilization of an electrical interconnection between brake antidive control and the vehicle leveling system whereby an effective block-out is provided for preventing leveling function of the vehicle suspension during brake antidive operation.

Still other and further objects and features of the present invention will at once become apparent to those skilled in the art from a consideration of the attached drawings wherein a preferred form of the invention is shown by way of illustration only, and wherein:

Figure 1 is a somewhat diagrammatic plan view of an automotive vehicle incorporating a suspension system construction in accordance with the present invention;

Figure 2 is a partial side elevational view, in cross section, taken along the line II—II of Figure 1;

Figure 3 is an enlarged view, in cross section, of a leveling valve constructed for utilization in accordance with the present invention; and Figure 4 is an antidive control valve utilized in the system of Figure 1, shown in side elevation.

As shown on the drawings:

As may be seen from a consideration of Figures 1 and 2, the present invention is adapted for use with an automotive vehicle of generally conventional form and having a frame 10 supported by four wheels 11, 12, 13 and 14 through front independent spring suspension arms 15 and 16 and rear axle 17. The arms 15 and 16 are connected to the frame 10 through a hydraulic-pneumatic suspension system which takes the place of a conventional spring connection. Such a hydraulic-pneumatic system is likewise provided for suspending the frame 10 from the axle 17. The units employed to position the arms 15 and 16 are substantially identical to those used for supporting the axle 17 relative to the frame and accordingly only the units at the rear of the vehicle will be specifically detailed.

As may be seen from a consideration of Figures 1 and 2 the rear axle 17 is associated with the vehicle frame 10 through a pair of suspension units of the hydraulic-pneumatic type, generally indicated at 20c and 20d. Each of these units comprises an outer cylinder 21 and a piston 22. The cylinder 21 is connected as at 23 in a pivotal manner to the frame 10 and the piston rod 22 is pivotally connected as at 24 to a bracket 25 fixedly secured in turn to the axle 17. While, of course, it will be apparent that in the construction as thus far set forth, the rear axle would be free to move relative to the frame in a fore and aft or lateral direction, it is preferred that the axle be connected to the vehicle engine through a torque tube such as indicated at 26 or by an equivalent radius rod wheel positioning structure. The lateral stability may be achieved likewise through any conventional linkage desired.

As shown, the cylinder 21 is provided with an upper and lower chamber 21a and 21b separated by means of a perforated divider plate 27. Hydraulic fluid is contained between the piston head 22a and a spring piston 28, and is free to move back and forth between chambers 21a and 21b via aperture 29 which provides a dashpot or shock absorber effect providing control of the pneumatic spring described below. It will be understood that aperture 29 may be replaced by any conventional shock absorber flow control valve. Air, or other suitable nonexplosive gas is confined between the spring piston 28 and the upper end of the cylinder 21, as indicated at 30. This gas is highly compressed and acts as a pneumatic spring between the axle 17 and the frame 10. As those skilled in the art of pneumatic suspensions are aware, the spring rate of the vehicle suspension may be modified by changing the pressure of the gas 30 and it will be understood that any conventional means for varying the pressure of the gas 30, or introducing it into the cylinder 21, may be used within the scope of the present invention.

As thus far above described, the individual hydraulic-pneumatic spring structures 20a, 20b, 20c and 20d, are capable of supplying the necessary spring or resiliency to the vehicle suspension. Without additional structure, they are, however, incapable of providing brake antidive or load responsive leveling operation. In accordance with the present invention, such additional functions are provided in a relatively simple manner while at the same time providing substantially completely automatic control. As may be seen from the drawings each of the spring units 20a, 20b, 20c and 20d is connected to a source of high pressure fluid in an accumulator 31 which may be of any conventional construction. This connection includes the load leveling valves 32 and 33 which control the flow of high pressure fluid to the front hydraulic-pneumatic springs 20a, 20b and the rear hydraulic-pneumatic springs 20c, 20d respectively, through the respective pressure conduits 34 and 35. The valves 32 and 33 are likewise connected to a low pressure tank, or sump, 36 by means of respective low pressure conduits 38 and 39. The valves 32 and 33 are in turn directly connected to the respective hydraulic-pneumatic springs 20a, 20b and 20c, 20d by means of control conduits 40, 40a, 41 and 41a.

Operation of the valves 32 and 33 for controlling the amount of hydraulic fluid in the hydraulic-pneumatic springs is accomplished by means of respective actuating levers 42 and 43 connected to respective roll stabilizer bars 44 and 45. As may be seen from Figure 1, the roll stabilizer bar 44 comprises a generally U-shaped bar pivotally supported in resilient bushings 44b to the frame 10. The ends 44a of the bar 44 are pivotally connected to the outboard ends of the wheel support arms 15 and 16 and accordingly move with the wheels 11 and 12. Thus, if both wheels 11 and 12 move upwardly relative to the frame the actuating lever 42 will move in a counterclockwise direction relative to the pivot axis of the bar 44 when the vehicle is viewed from the left hand side. Likewise, upon simultaneous downward movement of the vehicle wheels 11 and 12 relative to the frame, the lever 42 will move in a clockwise direction. Upon an instantaneous deflection of one of the wheels relative to the other, only a small deflection will take place in the lever 42 and, of course, if one wheel moves upwardly while the other moves downwardly substantially no movement of the lever 42 will take place. It will be apparent, therefore, that as the load on the front of the vehicle is increased, and the frame 10 drops toward the ground, the wheels 11 and 12 will move upwardly relative to the frame 10 causing movement of the valve lever 42 in a counterclockwise direction to actuate the valve 32 to apply more fluid under pressure to the hydraulic-pneumatic springs 20a and 20b to lift the frame 10 relative to the wheels 11 and 12 thereby returning it to a predetermined desired level. The specific operation of the valve 32 will be described below.

Control of the hydraulic-pneumatic springs 20c and 20d at the rear of the vehicle is accomplished in substantially the same manner by means of the lever 43 controlling the valve 33. As may be seen, the roll stabilizer bar 45 is connected at its outer ends 45a to the wheels 13 and 14 and accordingly, upon movement of the wheels 13 and 14 upwardly relative to the frame, upon an application of load to the frame, the lever 43 will move in a clockwise direction when the vehicle is viewed from the left, causing actuation of the valve 33 to supply more liquid under pressure to the hydraulic-pneumatic springs 20c, 20d.

The valves 32 and 33 are identical and take the form diagrammatically shown in Figure 3 in which the rear valve 33 is shown by way of illustration. As may there be seen, the rear roll stabilizer bar 45 operates a lever 43 to reciprocate a valve actuating rod 46. The rod 46 is connected to a spool valve generally indicated at 47 having a pair of lands 48 and 49 separated by an annular groove 50. The spool valve 47 is centered within the valve housing 51 by means of springs 52 and 53, or any other conventional centering means and in its central or neutral position operates to block off both the high pressure conduit 35 and the low pressure conduit 39 from the control conduit 41a leading to the hydraulic-pneumatic springs 20c, 20d. Upon movement of the control lever 43 in the clockwise direction as viewed in Figure 3, and as a result of the application of a heavy load to the frame 10, the spool valve core 47 moves toward the left connecting the high pressure conduit 35 to the control conduit 41a thereby introducing hydraulic fluid under pressure into the chamber 21a tending to move the piston rod 22 downwardly, thereby lifting the frame 10 relative to the axle 17 until the lever 43 assumes its design position, shown in Figure 3, and the valve 47 is again centered.

It will be obvious, of course, that a vehicle traveling over a rough road will encounter instantaneous vibrations causing a movement of the vehicle wheels vertically relative to the frame 10, even though no additional load has been applied to the frame in the form of additional passengers etc. It is not intended that such instantaneous forces actuate the leveling valve to effect a change in the level of the vehicle frame. Accordingly, a lost motion connection is provided between the lever 43 and the control rod 46, as indicated at 55. This lost motion connection prevents small instantaneous movements of the wheels, reflected in movement of the rod 45, from actuating the valve core 47. The lost motion connection such as at 55 preferably includes a resilient bushing material between the end 43a of the lever 43 and the eye 46a of the rod 46 in order to permit instantaneous deflections of the lever 43 without actuation of the valve core 47 while at the same time causing deflection of the valve core 47 upon a continued presence of the deflection in the lever 43. It will be understood that any other similar resilient lost motion connection may be provided to accomplish this same time delay function.

In addition to the resilient lost motion time delay provided for the valve actuation in order to prevent leveling operation during instantaneous road shocks, the lands 48 and 49 are machined to provide a slight overlap as at 48a and 49a of the annular port grooves 35a and 39a. The provision of this overlap prevents leveling operation by the valve core 47 until after a predetermined minimum change in load has been made. Thus, the system does not automatically level until a substantial variation in load is applied to the vehicle. It will be understood, of course, that the amount of overlap 48a and 49a may be varied and that it is exaggerated as shown in Figure 3 in order to simplify the illustration. In actual practice it is preferred that the overlap amount to several thousandths of an inch.

As above described, the application of additional loads to the vehicle frame 10 will cause movement of the valve core 47 to the left as viewed in Figure 3 to apply pressurized fluid to the rear hydraulic-pneumatic springs 20c and 20d. Removal of the additional load will, of course, cause movement of the vehicle frame 10 upwardly relative to the wheels as a result of re-expansion of the gas 30. This will result in a movement of the lever 43 in a counterclockwise direction tending to move the valve core 47 toward the right as viewed in Figure 3 to uncover the annular port 39a and permit fluid under pressure to flow back through the control conduit 41 to the low pressure sump 36 via conduit 39 until the frame has assumed its predetermined design level in which the control lever 43 assumes its central position shown in Figure 3. The chambers 56 and 57 containing the springs 52 and 53 are each vented to the low pressure sump 36 by means of bleed conduits 58 and 59, respectively, in order to prevent a hydraulic lock of the control valve 47 which might otherwise result from a leakage by the lands 48 and 49.

It will be apparent that as a result of the application of fluid pressure simultaneously to the two rear hydraulic-pneumatic cylinders 20c and 20d, the vehicle frame will remain level transversely. Further, in view of the provision of separate control valves for the front and the rear of the vehicle, the level of the vehicle is retained throughout, independently of the exact positioning of any additional weight that may have been added. The provision of such a leveling apparatus at each of the four wheels, however, causes a problem in that deceleration, or acceleration, of the vehicle will tend to apply an effective load transfer to the front or rear wheels respectively. Thus, with the system as thus far described, the rapid application of the vehicle brakes when the vehicle is traveling at a relatively high speed will cause an effective application of very heavy loads to the front of the vehicle, tending to depress the frame 10 relative to the front wheels 11 and 12, with a resultant actuation of the leveling valve 32. It is preferred that such instantaneous load applications not affect the leveling apparatus of the vehicle, at least not through the leveling system as above described since the reaction of such a leveling system to an instantaneous, and short lived, force will always be delayed providing a leveling action which is too late to affect the vehicle in the desired manner and which will instead, cause undesired vertical movements of the vehicle frame relative to the wheels. In order to provide a fast action leveling arrangement which is capable of preventing dive of the vehicle frame relative to the front wheels upon the application of braking forces, without at the same time adversely affecting the operation of the leveling system, an antibrake-dive valve 60 is employed. As may be seen from Figure 1, the valve 60 deflects fluid under pressure from the conduit 61 connected to the high pressure source 31 to the control conduit 40 via conduit 62 and at the same time vents control conduit 41 to the low pressure sump 36 via conduits 63 and 64.

The valve 60 is illustrated in diagrammatic form in the enlarged Figure 4. As there shown, a reciprocable spool valve core 65 is slidably mounted within the housing 66. The valve core 65 is provided with fluid flow control lands 67, 68 and 69 separated by annular grooves 70 and 71. Fluid pressure conduit 61 supplies an annular port 72 while the low pressure conduit 64 relieves an annular port 73. High pressure outlet port 74 supplies conduit 62 with fluid under pressure when the valve core 65 is moved toward the right as viewed in Figure 4 and, at the same time as such connection is made, port 75 connects the low pressure conduit 64 to control conduit 41 of the rear hydraulic-pneumatic suspension cylinders 20c and 20d.

Under ordinary circumstances it will be appreciated that the core 65 is maintained in its left hand position by means of hydraulic fluid under pressure in chamber 76 which is connected to control conduit 40 via conduits 77 and 62. These conduits have, at all times, the hydraulic pressure to be found in the front vehicle hydraulic-pneumatic suspension cylinders which corresponds to the weight of the vehicle on the individual suspension unit. This sizable pressure may be overcome only by the application of brake pressure to the opposite end of the core 65 via conduit 78 which is connected directly into the conventional hydraulic brake system and which applies hydraulic brake pressure to chamber 79. Upon the application of a heavy braking force, therefore, the valve core 65 is moved toward the right connecting conduits 61 and 62 and conduits 64 and 63. As a result, fluid under pressure is supplied to the front hydraulic-pneumatic suspension units 20a and 20b and fluid is vented from the rear units 20c and 20d. This pressure change is substantially instantaneous with the braking effort and applies a lifting force to the vehicle frame at the front end of the vehicle counteracting any vehicle brake dive that would ordinarily be experienced. Immediately upon release of the vehicle brakes fluid pressure in the chamber 76 will force the core 65 toward the left again blocking off the conduits 61 and 64 to prevent a further change in vehicle frame level. The front of the vehicle is subsequently lowered and the rear raised by means of the leveling valves 32 and 33 in the manner described above.

A leveling lock-out valve is provided for preventing any leveling action as a result of movement of the valve 32 or 33 during the braking action. These valves are preferably incorporated within the main housings of the valves 32 and 33 and may take the form shown at 80 in Figure 3. As there shown, a solenoid 81 operates to pull a valve plug 82 outwardly against a spring 83 to permit flow of fluid through control conduit 41 when the solenoid is energized. The solenoid 81, with a corresponding solenoid controlling valve 32 is connected in series with the vehicle ignition switch, shown at 85 in Figure 4. Additionally, a control switch 86 which is opened in response to the application of hydraulic braking pressure in the chamber 79, is connected in series with the ignition switch 85, the solenoids 80 and the battery 87. As a result of this interconnection, closure of the ignition switch 85 to energize the vehicle will cause energization of the solenoids 80 with the result that the vehicle leveling system will be in full operation. However, upon application of the brakes, the switch 86 will be opened and the solenoids 80 will be de-energized, permitting the plugs 82 to block off the conduits 40 and 41 from the respective leveling valves 32 and 33 and placing the suspension cylinders 20a, 20b, 20c and 20d solely under the influence of the antidive brake valve 60. As above noted, upon release of the braking pressure, the system will revert to its normal leveling operation, thereby permitting the vehicle frame to lower at the front to the proper level.

Provision of the ignition switch 85 in the lock-out circuit also prevents actuation of the leveling system when the vehicle is parked or otherwise unattended. This is important since it has been found that vehicles having a leveling system are of sufficient novelty to cause persons to experiment with them while they are parked, thereby depleting the accumulator and permitting the vehicle to settle to a very low level, in the absence of lock-out protection. Lock-out valves similar to valve 80 may also be employed in the anti-dive conduits 40 and 41 adjacent the cylinders 21 to prevent inadvertent operation of that portion of the system when the ignition is turned off.

It will thus be understood that I have provided a novel and substantially improved vehicle suspension system in which automatic leveling is provided and in which means are provided for preventing nose diving of the vehicle during the braking operation. Under the system above described, instantaneous road shocks do not affect the vehicle leveling, and further, no leveling operations are permitted when the vehicle is in its unattended condition. As a result of the present system, the application of the vehicle brakes during vehicle travel at relatively high speeds will cause the front of the vehicle to rise slightly and the rear of the vehicle to become somewhat depressed, the reverse of the situation ordinarily encountered during vehicle braking. This provides the operator with a sense of security and, in fact, helps to maintain him in his seat during sudden stops. Additionally, the vehicle is provided with a complete automatic leveling system in which the body of the vehicle is maintained at a predetermined level independently of the passenger or other load applied.

As above set forth, delay means are provided in the leveling valve system for preventing the transmission of instantaneous road vibrations to the leveling valves. In addition to the resilient lost motion connection provided at 43a, delay may be introduced into the system to render it less sensitive to intermittent instantaneous shock in the form of a restriction in the conduits 40a and 41a connecting the respective leveling valves 32 and 33 to the control conduits 40 and 41. Such a restriction may take the form of a reduced diameter conduit 40a or 41a, as suggested by the dimensions shown in Figure 4.

It will be appreciated that as a result of the heavy braking pressure required to overcome the normal pressure in chamber 76, the normal pressure exerted on the brakes while the vehicle is standing at an intersection or the like is insufficient to move the valve core 65. The anti-dive feature will thus operate only when full braking pressures are employed. A spring 69a may, if desired, be used to assure a predetermined required brake pressure before anti-dive will occur.

As a further arrangement it will be understood that while automatic leveling has been provided at both the front and the rear of the vehicle, in order to reduce the cost of the system, a manual leveling valve may be provided in the front of the vehicle in place of the valve 32. In most instances of passenger vehicle use this will prove sufficient since ordinarily additional loads applied to passenger vehicles are placed in the vehicle trunk or in the rear seat thereof and are accordingly applied mainly over the rear axle.

It will be apparent to those skilled in the art that still further variations may be made in accordance with the principles of the present invention without departing from the scope of the novel concepts thereof. Accordingly, it is my intention that the scope of the present invention be limited solely by that of the hereinafter appended claims.

I claim as my invention:

1. In combination in a vehicle having a frame and rear axle, a hydraulic-pneumatic spring positioned between said axle and said frame and comprising a body of gas confined in compressed state by a body of confined fluid under pressure, a source of fluid under pressure, leveling valve means responsive to a downward movement of said frame relative to said axle to connect said source to said spring to increase the quantity of confined fluid therein to raise said frame and responsive to upward relative movement of said frame to relieve the pressure of said body of confined fluid, a hydraulic brake for retarding rotation of said axle, and a hydraulic valve actuated by braking pressure in said brake to relieve pressure of said confined body of fluid simultaneously with and immediately upon application of hydraulic braking pressure to said brakes.

2. In combination in a vehicle having a frame and rear axle, a hydraulic-pneumatic spring positioned between said axle and said frame and comprising a body of gas confined in compressed state by a body of confined fluid under pressure, a source of fluid under pressure, leveling valve means responsive to a downward movement of said frame relative to said axle to connect said source to said spring to increase the quantity of confined fluid therein to raise said frame and responsive to upward relative movement of said frame to relieve the pressure of said body of confined fluid, a brake for retarding rotation of said axle, and a hydraulic valve actuated by braking pressure in said brake to relieve pressure of said confined body of fluid simultaneously with and immediately upon application of braking pressure to said brakes, said last named means being independent of said leveling valve.

3. In combination in a vehicle having a frame and rear axle, a hydraulic-pneumatic spring positioned between said axle and said frame and comprising a body of gas confined in compressed state by a body of confined fluid under pressure, a source of fluid under pressure, leveling valve means responsive to a downward movement of said frame relative to said axle to connect said source to said spring to increase the quantity of confined fluid therein to raise said frame and responsive to upward relative movement of said frame to relieve the pressure of said body of confined fluid, a brake for retarding rotation of said axle, and a hydraulic valve actuated by braking pressure in said brake to relieve pressure of said confined body of fluid simultaneously with and immediately upon application of said brakes said last named means being independent of said leveling valve and including means operative to block said leveling valve from effective leveling operation.

4. In combination in a vehicle having a frame and rear axle, a hydraulic-pneumatic spring positioned between said axle and said frame and comprising a body of gas confined in compressed state by a body of confined fluid under pressure, a source of fluid under pressure, leveling valve means responsive to a downward movement of said frame relative to said axle to connect said source to said spring to increase the quantity of confined fluid therein to raise said frame and responsive to upward relative movement of said frame to relieve the pressure of said body of confined fluid, time delay means associated with said leveling valve for preventing leveling actuation thereof during rapid oscillations of said axle relative to said frame, a brake for retarding rotation of said axle, and a hydraulic valve actuated by braking pressure in said brake to relieve pressure of said confined body of fluid by and simultaneously with application of hydraulic braking pressure to said brakes.

5. In combination in a suspension system for a vehicle frame, front and rear hydraulic-pneumatic springs for resiliently supporting the vehicle frame relative to respective front and rear wheels thereof, leveling valve means responsive to a lowering of said frame relative to said wheels for applying fluid under pressure to each of said springs to raise said frame to a predetermined desired level, brake means for retarding rotation of said wheels, and means for simultaneously applying fluid under pressure to the front hydraulic-pneumatic spring and relieving fluid from the rear hydraulic-pneumatic spring simultaneously with and upon the application of braking force to said brake means said means comprising a valve actuated by the said braking force applying said fluid under pressure to and relieving said fluid under pressure from the front and rear springs respectively.

6. In combination in a suspension system for a vehicle frame, front and rear hydraulic-pneumatic springs for resiliently supporting the vehicle frame relative to respective front and rear wheels thereof, leveling valve means responsive to a lowering of said frame relative to said wheels for applying fluid under pressure to each of said springs to raise said frame to a predetermined desired level, brake means for retarding rotation of said wheels, means for simultaneously applying fluid under pressure to the front hydraulic-pneumatic spring and relieving fluid from the rear hydraulic-pneumatic spring when the vehicle brakes are applied, and a lock-out valve for each spring operatively connected with said brake means whereby application of said brakes actuate said lock-out valve to render said leveling valve means ineffective to provide leveling action.

7. In combination in a suspension system for a vehicle frame, front and rear hydraulic-pneumatic springs for resiliently supporting the vehicle frame relative to respective front and rear wheels thereof, leveling valve means responsive to a lowering of said frame relative to said wheels for applying fluid under pressure to each of said springs to raise said frame to a predetermined desired level, brake means for retarding rotation of said wheels, means for simultaneously applying fluid under pressure to the front hydraulic-pneumatic spring and relieving fluid from the rear hydraulic-pneumatic spring when the vehicle brakes are applied, time delay means associated with said leveling valve for preventing leveling of said frame during rapid oscillations of said wheels, and leveling valve lock-out means operative substantially simultaneously with the actuation of said brake means for rendering said leveling valve means ineffective to level said frame.

8. In combination in a vehicle suspension system, front and rear wheels, a frame, a hydraulic-pneumatic spring positioned between each said wheel and said frame, each said spring comprising a body of gas compressed by a moving wall actuated by hydraulic fluid under pressure proportional to the load on the wheel associated therewith, a source of hydraulic fluid under pressure, a leveling valve controlling the flow of fluid from said source to the hydraulic-pneumatic spring associated with said rear wheel, actuating means movable in response to relative movement between said frame and said rear wheel and connected to said leveling valve to actuate said valve to maintain said frame and said rear wheel at a predetermined relative position, antidive brake valve means connected with each of said springs and operative by and simultaneously with the application of brake actuating pressure to the vehicle brakes to introduce fluid from said source to the hydraulic-pneumatic spring associated with said front wheel.

9. In combination in a vehicle suspension system, front and rear wheels, a frame, a hydraulic-pneumatic spring positioned between each said wheel and said frame, each said spring comprising a body of gas compressed by a moving wall actuated by hydraulic fluid under pressure proportional to the load on the wheel associated therewith, a source of hydraulic fluid under pressure, a leveling valve controlling the flow of fluid from said source to the hydraulic-pneumatic spring associated with said rear wheel, actuating means movable in response to relative movement between said frame and said rear wheel and connected to said leveling valve to actuate said valve to maintain said frame and said rear wheel at a predetermined relative position, antidive brake valve means connected with each of said springs and operative by and simultaneously with the application of brake actuating pressure to the vehicle brakes to introduce fluid from said source to the hydraulic-pneumatic spring associated with said front wheel and to relieve fluid under pressure from the hydraulic-pneumatic spring associated with said rear wheel.

10. In combination in a vehicle suspension system, front and rear wheels, a frame, a hydraulic-pneumatic spring positioned between each said wheel and said frame, each said spring comprising a body of gas compressed by a moving wall actuated by hydraulic fluid under pressure proportional to the load on the wheel associated therewith, a source of hydraulic fluid under pressure, a leveling valve controlling the flow of fluid from said source to the hydraulic-pneumatic spring associated with said rear wheel, actuating means movable in response to relative movement between said frame and said rear wheel and connected to said leveling valve to actuate said valve to maintain said frame and said rear wheel at a predetermined relative position, antidive brake valve means connected with each of said springs and responsive to the application of pressure to the vehicle brakes to introduce fluid from said source to the hydraulic-pneumatic spring associated with said front wheel and to relieve fluid under pressure from the hydraulic-pneumatic spring associated with said rear wheel, and leveling valve lock-out means operative during the actuation of the brake valve to render said leveling valve ineffective to change the level of said vehicle frame.

11. In combination in a vehicle suspension system, front and rear wheels, a frame, a hydraulic-pneumatic spring positioned between each of said wheel and said frame, each said spring comprising a body of gas compressed by a moving wall actuated by hydraulic fluid under pressure proportional to the load on the wheel associated therewith, a source of hydraulic fluid under pressure, a leveling valve controlling the flow of fluid from said source to the hydraulic-pneumatic spring associated with said rear wheel, actuating means movable in response to relative movement between said frame and said rear wheel and connected to said leveling valve to actuate said valve to maintain said frame and said rear wheel at a predetermined relative position, antidive brake valve means connected with each of said springs and responsive to the application of pressure to the vehicle brakes to introduce fluid from said source to the hydraulic-pneumatic springs associated with said front wheel and to relieve fluid under pressure from the hydraulic-pneumatic spring associated with said rear wheel, and leveling valve lock-out means operative during the actuation of the brake valve to render said leveling valve ineffective to change the level of said vehicle frame, said last named means being electrically connected with the ignition switch of the vehicle whereby said leveling valve is also rendered ineffective to change the level of said vehicle frame when said vehicle ignition switch is open.

12. In combination in a vehicle suspension system, front and rear wheels, a frame, a hydraulic-pneumatic spring positioned between each said wheel and said frame, each said spring comprising a body of gas compressed by a moving wall actuated by hydraulic fluid under a pressure proportional to the load on the wheel associated therewith, a source of hydraulic fluid under pressure, a leveling valve controlling the flow of fluid from said source to the hydraulic-pneumatic spring associated with each said wheel, actuating means movable in response to relative movement between said frame and said front and rear wheels and connected to respective front and rear leveling valves to actuate said valves to maintain said frame and said wheels at a predetermined relative level position, and antidive brake valve means connected with each of said springs and operative by and simultaneously with application of brake actuating pressure to the vehicle brakes to substantially instantly introduce fluid from said source to the hydraulic-pneumatic spring associated with said front wheel and to relieve fluid under pressure from the hydraulic-pneumatic spring associated with said rear wheels.

13. In combination in a vehicle suspension system, front and rear wheels, a frame, a hydraulic-pneumatic spring positioned between each said wheel and said frame, each said spring comprising a body of gas compressed by a moving wall actuated by hydraulic fluid under a pressure proportional to the load on the wheel associated therewith, a source of hydraulic fluid under pressure, a leveling valve controlling the flow of fluid from said source to the hydraulic-pneumatic spring associated with each said wheel, actuating means movable in response to relative movement between said frame and said front and rear wheels and connected to respective front and rear leveling valves to actuate said valves to maintain said frame and said wheels at a predetermined relative level position, antidive brake valve means connected with each of said springs and responsive to the application of pressure to the vehicle brakes to substantially instantly introduce fluid from said source to the hydraulic-pneumatic spring associated with said front wheel and to relieve fluid under pressure from the hydraulic-pneumatic spring associated with said rear wheels, and leveling valve lock-out means operative during the actuation of the brake valve to render said leveling valve ineffective to change the level of said vehicle frame.

14. In combination in a vehicle suspension system, front and rear wheels, a frame, a hydraulic-pneumatic spring positioned between each said wheel and said frame, each said spring comprising a body of gas compressed by a moving wall actuated by hydraulic fluid under a pressure proportional to the load on the wheel associated therewith, a source of hydraulic fluid under pressure, a leveling valve controlling the flow of fluid from said source to the hydraulic-pneumatic spring associated with each said wheel, actuating means movable in response to relative movement between said frame and said front and rear wheels and connected to respective front and rear leveling valves to actuate said valves to maintain said frame and said wheels at a predetermined relative level position, antidive brake valve means connected with each of said springs and responsive to the application of pressure to the vehicle brakes to substantially instantly introduce fluid from said source to the hydraulic-pneumatic spring associated with said front wheel and to relieve fluid under pressure from the hydraulic-pneumatic spring associated with said rear wheels, leveling valve lock-out means operative during the actuation of the brake valve to render said leveling valve ineffective to change the level of said vehicle frame, and time delay means preventing leveling action of said spring under rapid frame oscillations.

15. In combination in a vehicle suspension system, front and rear wheels, a frame, a hydraulic-pneumatic spring positioned between each said wheel and said frame, each said spring comprising a body of gas compressed by a moving wall actuated by hydraulic fluid under a pressure proportional to the load on the wheel associated therewith, a source of hydraulic fluid under pressure, a leveling valve controlling the flow of fluid from said source to the hydraulic-pneumatic spring associated with each said wheel, actuating means movable in response to relative movement between said frame and said front and rear wheels and connected to respective front and rear leveling valves to actuate said valves to maintain said frame and said wheels at a predetermined relative level position, antidive brake valve means connected with each of said springs and responsive to the application of pressure to the vehicle brakes to substantially instantly introduce fluid from said source to the hydraulic-pneumatic spring associated with said front wheel and to relieve fluid under pressure from the hydraulic-pneumatic spring associated with said rear wheels, leveling valve lock-out means operative during the actuation of the brake valve to render said leveling valve ineffective to change the level of said vehicle frame, and time delay means preventing leveling action of said spring under rapid frame oscillations, said time delay means comprising a restriction in the outlet of said leveling valve each said leveling valve leading to its associated hydraulic-pneumatic spring.

16. In combination in a vehicle suspension system, front and rear wheels, a frame, a hydraulic-pneumatic spring positioned between each said wheel and said frame, each said spring comprising a body of gas compressed by a moving wall actuated by hydraulic fluid under a pressure proportional to the load on the wheel associated therewith, a source of hydraulic fluid under pressure, a leveling valve controlling the flow of fluid from said source to the hydraulic-pneumatic spring associated with each said wheel, actuating means movable in response to relative movement between said frame and said front and rear wheels and connected to respective front and rear leveling valves to actuate said valves to maintain said frame and said wheels at a predetermined relative level position, antidive brake valve means connected with each of said springs and responsive to the application of pressure to the vehicle brakes to substantially instantly introduce fluid from said source to the hydraulic-pneumatic spring associated with said front wheel and to relieve fluid under pressure from the hydraulic-pneumatic spring associated with said rear wheels, leveling valve lock-out means operative during the actuation of the brake valve to render said leveling valve ineffective to change the level of said vehicle frame, and time delay means preventing leveling action of said spring under rapid frame oscillations, said time delay means comprising a resilient connection between said actuating means and said leveling valve.

References Cited in the file of this patent

UNITED STATES PATENTS

| | | |
|---|---|---|
| 2,184,202 | Tschanz | Dec. 19, 1939 |
| 2,289,907 | Friedlander | July 14, 1942 |
| 2,593,040 | Lloyd | Apr. 15, 1952 |
| 2,644,699 | Weiertz | July 7, 1953 |
| 2,714,517 | Powell | Aug. 2, 1955 |

FOREIGN PATENTS

| | | |
|---|---|---|
| 1,040,639 | France | Oct. 16, 1953 |
| 518,848 | Great Britain | Mar. 10, 1940 |